Nov. 2, 1965   B. R. ANKERSEN   3,215,419
SALT PUMPS AND HEAT TREATING LINES
Filed Oct. 18, 1961   3 Sheets-Sheet 1

INVENTOR.
Borge Richard Ankersen
BY
his ATTORNEYS

Nov. 2, 1965   B. R. ANKERSEN   3,215,419
SALT PUMPS AND HEAT TREATING LINES
Filed Oct. 18, 1961   3 Sheets-Sheet 2

INVENTOR.
Borge Richard Ankerson
BY
his ATTORNEYS

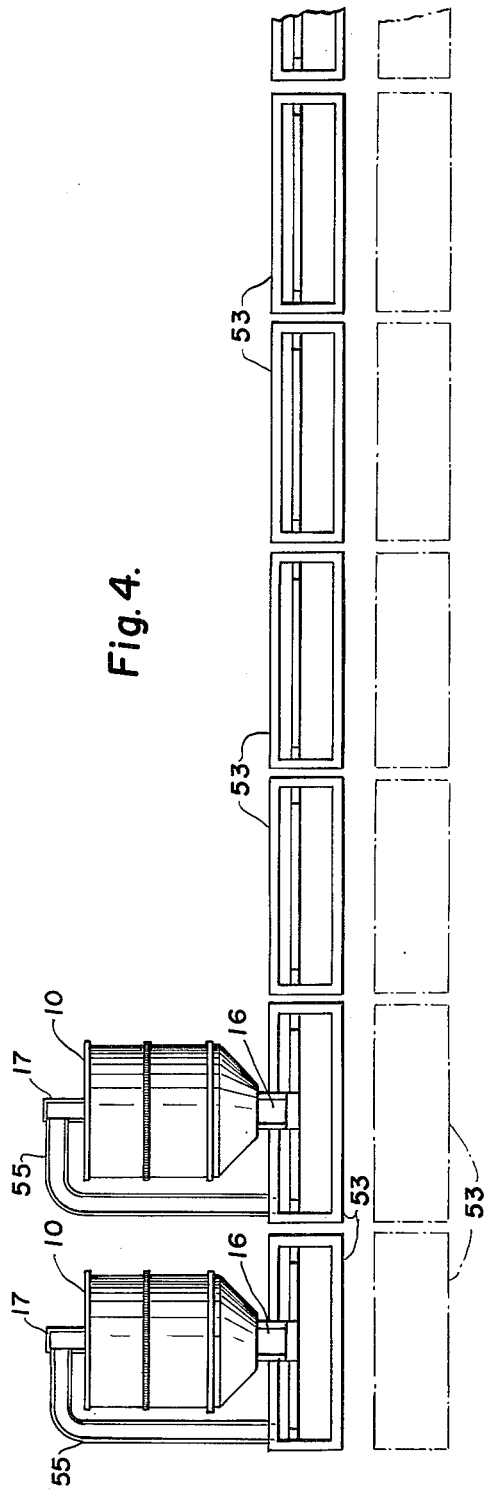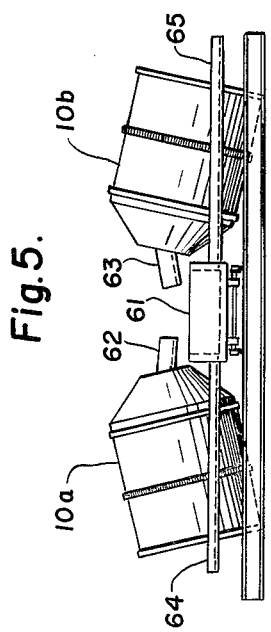

United States Patent Office 3,215,419
Patented Nov. 2, 1965

3,215,419
SALT PUMPS AND HEAT TREATING LINES
Borge R. Ankersen, 32871 Chatham Lane,
Birmingham, Mich.
Filed Oct 18, 1961, Ser. No. 145,846
10 Claims. (Cl. 266—4)

This invention relates to salt pumps and heat treating lines and particularly to a barrel type combination heating furnace and pump and a heat treating line in combination therewith.

There are many situations where the continuous use of molten salt is desirable for heat treating of metals or for other purposes. This useful area has long been recognized and many attempts have been made to provide a mechanism for heating and pumping salt onto articles to be treated. For example, salt has been melted in electrically heated pots and propeller pumps, injection pumps and various other types of pumps have been proposed to remove the salt in the molten state from the heated bath to deliver it to an object to be treated and to then return it to the furnace. These attempts have been less than satisfactory for a great variety of reasons. In the first place, salt in the molten condition is highly corrosive and the heat is highly penetrating so that metal pump parts are quickly detsroyed. Refractory pump parts are similarly difficult to maintain in the salt bath furnace because of the high temperatures and the cracking and spalling which occurs upon temperature change. The result is that no really satisfactory means of handling salt from one vessel to another has been available.

I have invented a salt pump for handling molten salt which may be used as a pump alone or as a combination furnace and pump for melting and pumping salt and the combination of such furnace with a heat treating line for treating metal with molten salt as for quenching and the like. The device of this invention is free of the defects which have characterized prior art pumps. There are no metal or ceramic moving pump parts.

I preferably provide a cylindrical furnace having a refractory lining, a frusto conical end on said housing having an opening at the apex thereof lying on the axis of the cylindrical housing, spaced chordal enclosed passages beginning adjacent the inner periphery of the furnace housing and extending diagonally across the conical tip discharging at the opening in the apex at the frusto conical end, means receiving molten salt from said passages for delivery out of the furnace, means for rotating said cylindrical furnace about its axis and delivery means returning used salt to the interior of the furnace. Preferably, heating means are provided in the furnace for heating the salt therein. Work holding means are preferably provided at the discharge end of the furnace adapted to carry work to be treated and receiving the molten salt over the workpiece for delivery back to the salt return means.

In the foregoing general description, I have set out certain problems of this field of art and certain objects, purposes and advantages of my invention. Other objects, purposes and advantages will be apparent from a consideration of the following description and the accompanying drawings in which:

FIGURE 4 is a top plan view of a second embodiment of heat treating lines according to my invention; and FIGURE 5 is a side elevation of a third embodiment of treating line according to my invention.

Figure 1:
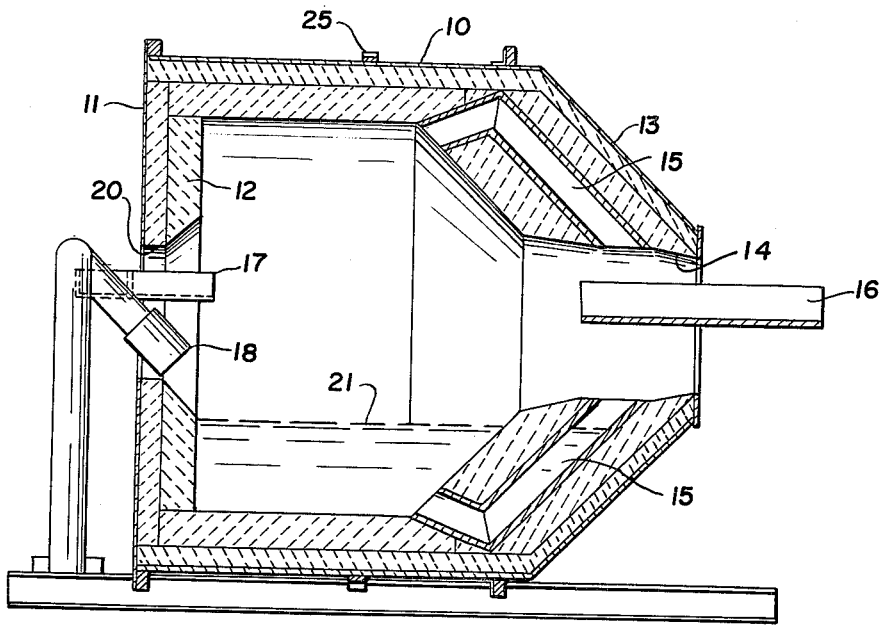
FIGURE 1 is a longitudinal section through a salt pump according to my invention.
Figure 2:
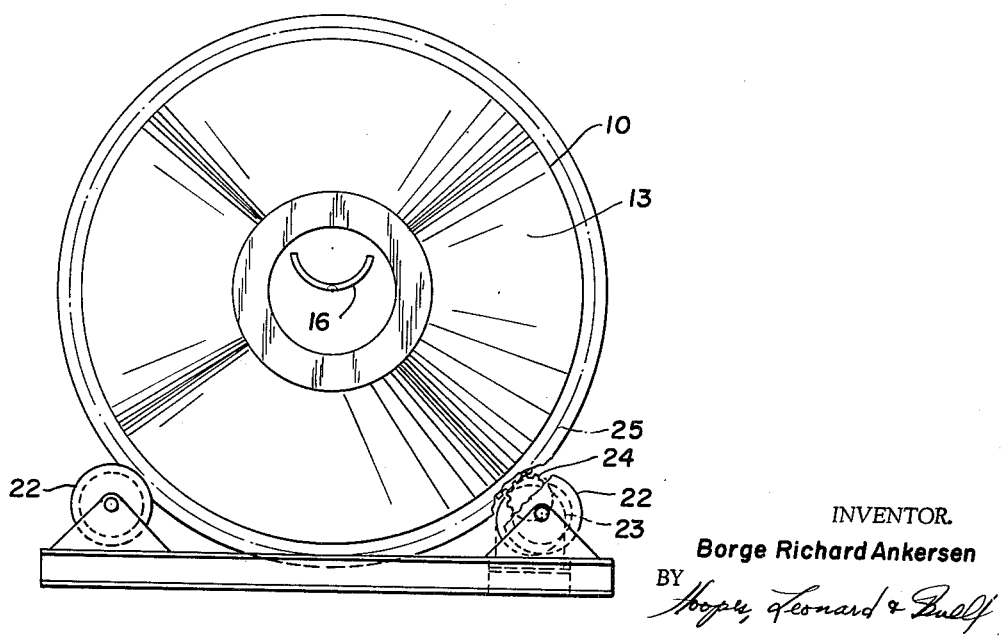
FIGURE 2 is an end elevation of the salt pump of FIGURE 1 viewed from the right.

Referring to the drawings, I have illustrated in FIGURES 1 and 2, a furnace 10 having an outer steel shell 11 in cylindrical form and a refractory lining 12. One end of said housing is provided with a frusto conical end portion 13 having an opening 14 in the apex thereof and lying on the axis of the furnace housing 10. Chordal passages 15 are formed of refractory material along the walls of the frusto conical end 13. These chordal passages begin adjacent the inner periphery of the refractory wall and extend diagonally along the wall of the frusto conical end to the opening 14. A discharge spout 16 extends into the opening 14 to receive molten salt from the passages 15 and delivers to a treating bath or an object to be treated as the case may be. A rear trough 17 delivers the salt into the opposite end of the furnace after it has served its purpose as a treating means. A burner 18 is provided in the end of the furnace opposite the frusto conical end in an opening 20 on the axis of the furnace. The burner is directed towards the surface of a bath of salt 21 in the furnace.

The pump operates as follows: The bath of salt 21 is heated by the flame directed onto it through burner 18. The furnace housing is rotated on carrier wheels 22 by means of a motor 23 driving pinion 24 and rack 25 surrounding the periphery of the furnace 10. This is a conventional type of drive arrangement. The molten salt at the bottom of the furnace is picked up by the open end of passages 15 as they reach the bottom of the furnace during rotation. As the barrel rotates the end of passages 15 carrying the salt is up-ended and the salt runs down through the passages to discharge onto trough 16 where it is delivered out of the furnace onto the workpiece treated or into a selected vessel (not shown). The salt after being used is returned through trough 17 in the opposite end of the furnace.

Figure 3:
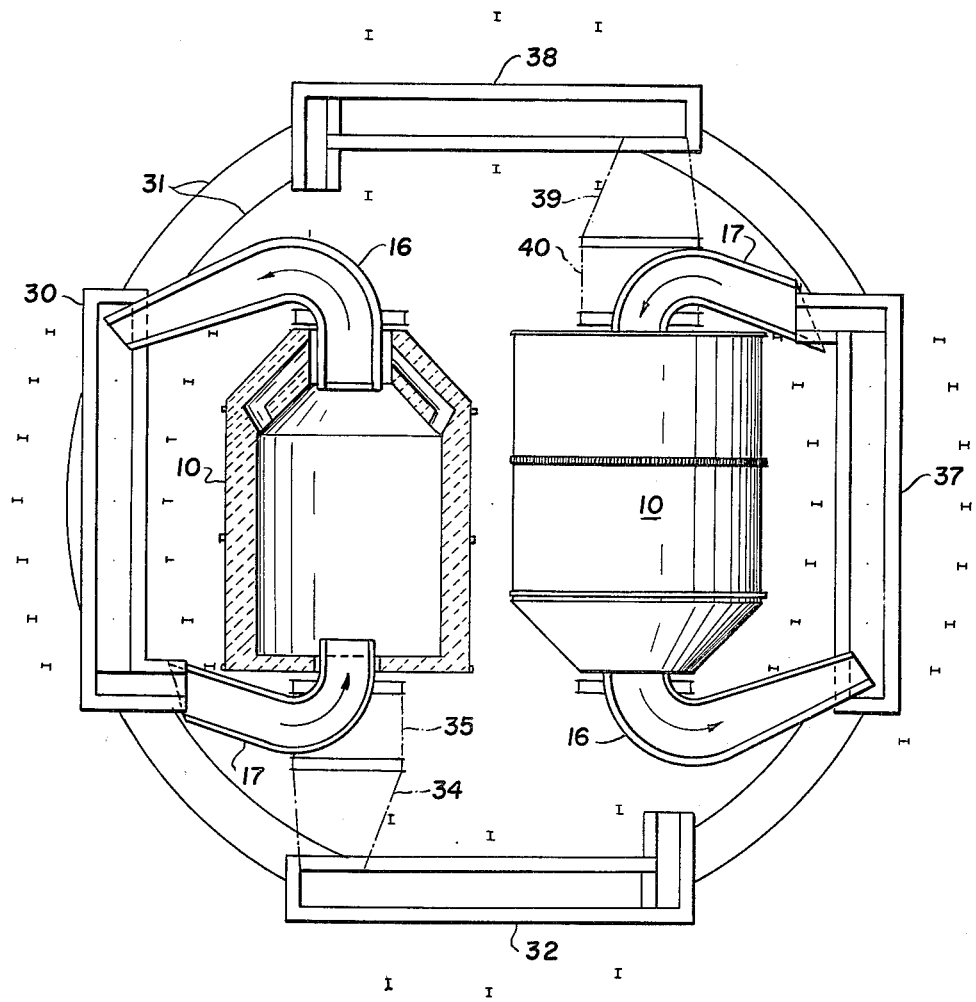
FIGURE 3 is a top plan view of a heat treating line incorporating a pair of salt pumps according to my invention.

In FIGURE 3, I have shown a pair of furnaces such as illustrated in FIGURE 1 assembled in a heat treating line. The furnaces 10 discharge into trough 16 as described above. Trough 16 delivers the molten salt into a refractory lined car 30 carrying workpieces to be treated at a given temperature. The salt passes through the car 30 to the return trough 17 and into furnace 10 where it is again heated and discharged into the car. When the workpieces have reached the desired temperature as, for example, 2250° F., the car 30 is moved on track 31 to a cooling zone, illustrated by the position of car 32. There the workpieces are cooled by air drawn across the workpieces into an air duct 34 connected to the furnace flue 35. When the level of air cooling desired has been reached, as for example 500° F., the workpiece is moved again on track 31 to position 37 where the second furnace discharges salt at another temperature, for example, 1400° F., into the car across the workpieces and into return trough 17. When the workpieces have reached the desired temperature the car is removed to a fourth and final position 38 where it is air cooled to room temperature by induced draft through a draft hood 39 connected with furnace flue 40. After room temperature has been achieved, the load is removed and the car reloaded with workpieces to begin the cycle.

In the arrangement shown in FIGURE 4, I have illustrated a pair of furnaces side by side at two different temperatures with workpiece handling cars 53 adapted to move in front of the furnaces. Molten salt is delivered by trough 16 into the cars 54 and returned by troughs 55 and 17 into the interior of the furnace. As the temperature is reached each car is treated and moved to the next position.

In FIGURE 5 I have illustrated a pair of furnaces 10a and 10b on opposite sides of a treating bath 61. Each of furnaces 10a and 10b delivers salt selectively to treating bath 61 through troughs 62 and 63 respectively. Troughs 64 and 65 return salt to the respective furnace. This line is used for isothermal annealing or aluminum brazing such as of honeycomb wing sections where two different successive temperatures are demanded. Furnace 10a for example delivers high temperature salt, whereas furnace 10b delivers lower temperature salt for rapid cooling. The operation is believed to be obvious from the drawings.

While I have illustrated and described certain preferred practices and apparatuses of my invention, it will be understood that this invention may be otherwise embodied and practiced within the scope of the following claims.

I claim:

1. A salt bath pump comprising a cylindrical body, diagonal chordal conduit means integral with said body extending from a point adjacent the inner wall of said body to a point adjacent the axis of the body at one end, an opening at the axis of the body at said end, means receiving molten salt carried by said chordal conduit means and delivering the molten salt from the cylindrical body to a treating zone spaced from the body and means for rotating said body.

2. A salt bath pump comprising a cylindrical body, diagonal chordal conduit means integral with said body extending from a point adjacent the inner wall of said body to a point adjacent the axis of the body at one end, an opening at the axis of the body at said end, means receiving molten salt carried by said chordal conduit means and delivering the molten salt from the body to a treating zone spaced from the body and salt return means returning the salt from the treating zone spaced from the body to the interior of the body and means for rotating said body.

3. A salt bath pump comprising a cylindrical furnace body, a body of salt in said furnace body, heating means acting on the body of salt in said furnace to maintain said salt in the molten state, diagonal chordal conduit means integral with said body extending from a point adjacent the inner wall of said furnace body to a point adjacent the axis of the body at one end, an opening at the axis of the body at said end, means receiving molten salt carried by said chordal conduit means and delivering the molten salt from the furnace to a treating zone spaced from the body and means for rotating said body.

4. A salt bath pump comprising a cylindrical furnace body, a body of salt in said furnace body, heating means acting on the body of salt in said furnace to maintain said salt in the molten state, diagonal chordal conduit means integral with the body extending from a point adjacent the inner wall of said furnace body to a point adjacent the axis of the body at one end, an opening at the axis of the body at said end, means receiving molten salt carried by said chordal conduit means and delivering the molten salt from the furnace to a treating zone spaced from the body and salt return means returning the salt from the treating zone spaced from the body to the interior of the furnace and means for rotating said body.

5. A salt bath pump comprising a cylindrical furnace body, a body of salt in said furnace body, heating means acting in the furnace interior to maintain the body of salt molten, a frusto conical end on said body, diagonal chordal conduit means integral with the body extending along the inner wall of said frusto conical end from a point adjacent the inner periphery of the furnace to the apex of the frusto-conical end, an opening at the apex of said end, means receiving molten salt carried by said chordal conduit means through said opening and delivering the molten salt from the furnace to a treating zone spaced from the body and means for rotating said furnace body.

6. A salt bath pump comprising a cylindrical furnace body, a body of salt in said furnace body, heating means acting on said body of salt to maintain it in molten condition, a frusto conical end on said body, diagonal chordal conduit means integral with the body extending along the inner wall of said fursto conical end from a point adjacent the inner periphery of the furnace to the apex of the frusto-conical end, an opening at the apex of said end, means receiving molten salt carried by said chordal conduit means through said opening and delivering the molten salt from the furnace to a treating zone spaced from the body, and molten salt return means returning the salt from the treating zone spaced from the body to the interior of the furnace and means for rotating said furnace body.

7. In combination a salt bath pump comprising a cylindrical furnace body, a body of salt in said furnace, heating means acting on said body of salt to maintain it in molten condition, diagonal chordal conduit means integral with the body extending from a point adjacent the inner wall of said furnace body to a point adjacent the axis of the body at one end, an opening at the axis of the body at said end, means receiving molten salt carried by said chordal conduit means and delivering the molten salt from the furnace, a work carrier receiving said molten salt onto work carried therein, and salt return means receiving salt from the work carrier and returning said salt to the furnace body and means for rotating said furnace body.

8. A combination as claimed in claim 7 wherein a plurality of work carriers are provided and track means are provided for said work carriers, said work carriers being movable successively to a salt receiving and discharge position relative to said furnace.

9. In combination a pair of spaced salt bath pumps comprising a cylindrical furnace body, a body of salt in said furnace, heating means acting on said body of salt to maintain it in a molten state, a frusto conical end on said body, diagonal chordal conduit means extending along the inner wall of said frusto conical end and integral therewith from a point adjacent the inner periphery of the furnace to the apex of the frusto-conical end, an opening at the apex of said end, means for rotating said furnace body, means receiving molten salt carried by said chordal conduit means through said opening, a plurality of work carriers adapted to be successively moved to a position receiving the salt from said salt receiving means onto work carried therein, and salt return means receiving salt from the work carrier and return said salt to the furnace.

10. A combination as claimed in claim 9 wherein cooling chambers adjacent each of said furnaces receive the work carrier after each salt bath treatment whereby the work being treated is cooled to a selected temperature.

References Cited by the Examiner

UNITED STATES PATENTS

| 1,841,625 | 1/32 | Musso | 266—18 |
| 2,768,075 | 10/56 | Sterental | 75—68 |
| 2,878,004 | 3/59 | Saeman | 266—33 X |
| 2,919,125 | 12/59 | Kocks | 266—5 |
| 3,070,437 | 12/62 | Bacheldor | 266—33 X |

FOREIGN PATENTS

| 606,734 | 8/48 | Great Britain. |

JOHN F. CAMPBELL, *Primary Examiner.*

RAY K. WINDHAM, MORRIS O. WOLK, *Examiners.*